(12) United States Patent
Takagi et al.

(10) Patent No.: US 7,955,725 B2
(45) Date of Patent: Jun. 7, 2011

(54) PACKAGE FOR SODIUM-SULFUR BATTERY

(75) Inventors: Yahei Takagi, Nagoya (JP); Mikine Takeyama, Hashima-County (JP)

(73) Assignee: NGK Insulators, Ltd., Nagoya (JP)

( * ) Notice: Subject to any disclaimer, the term of this patent is extended or adjusted under 35 U.S.C. 154(b) by 743 days.

(21) Appl. No.: 12/039,939

(22) Filed: Feb. 29, 2008

(65) Prior Publication Data

US 2008/0220319 A1    Sep. 11, 2008

(30) Foreign Application Priority Data

Mar. 8, 2007   (JP) .................................. 2007-058869

(51) Int. Cl.
  *H01M 2/12*   (2006.01)
(52) U.S. Cl. .............. 429/82; 429/83; 429/99; 429/152; 429/153; 429/163
(58) Field of Classification Search ............... 429/82, 429/83, 99, 142, 152, 153, 154, 163, 167, 429/168, 176, 177
See application file for complete search history.

(56) References Cited

U.S. PATENT DOCUMENTS

2007/0031728 A1 *  2/2007  Lee et al. ................. 429/120

FOREIGN PATENT DOCUMENTS

JP    3474821 B2    9/2003

* cited by examiner

*Primary Examiner* — Patrick Ryan
*Assistant Examiner* — Ben Lewis
(74) *Attorney, Agent, or Firm* — Burr & Brown

(57) ABSTRACT

Provided is a package for sodium-sulfur batteries in which the inner temperature can be suitably controlled even when it is installed in the place where temperatures and direction of wind change violently. Specifically, there is provided a package 101 for sodium-sulfur batteries in which air guiding plates 106a, 106b are provided being inclined obliquely and downwardly toward wall faces 109a, 109b between bottom surfaces of module batteries 4a, 4b and wall faces 109a, 109b, and in addition, flow rectifying plates 107a, 107b are provided being inclined obliquely and upwardly toward space 8 from the upper surface of module batteries 4a, 4b.

10 Claims, 7 Drawing Sheets

PACKAGE FOR SODIUM-SULFUR BATTERY

TECHNICAL FIELD

The present invention relates to a package for sodium-sulfur batteries in which a plurality of module batteries are stored.

BACKGROUND ART

Sodium-sulfur batteries are utilized as main constitutive devices of electric power storage and compensation apparatus for load leveling (demand for electric power). Sodium-sulfur batteries are secondary batteries in which molten metallic sodium as a negative electrode active material and molten sulfur as a positive electrode active material are disposed being separated by a β-alumina solid electrolyte having selective permeability to sodium ions. Such sodium-sulfur batteries are constructed as a sodium-sulfur battery system in which a plurality of module batteries comprising a given number of cells connected are further connected and disposed in a frame together with controllers, and the frame is stored in a package. Outer shape of conventional sodium-sulfur battery system is shown in FIG. 8, FIG. 9 and FIG. 10. Inner structures of conventional sodium-sulfur battery system is shown in FIG. 11, FIG. 12 and FIG. 13. In FIG. 12, the arrow indicates flow of air (wind).

In order to efficiently operate (charge and discharge) the sodium-sulfur battery system 10, it is necessary to actuate module battery 4 at a high temperature of 280° C. or higher for the reasons such as temperature characteristics of sodium ion conductivity of the β-alumina solid electrolyte. On the other hand, various members constituting the sodium-sulfur battery system 10 have restriction in heat resistance. Therefore, it is very important to control the actuation temperature of the module battery 4 to a given range (about 280-360° C.). In charging and discharging, the internal resistance charging is endothermic reaction while the discharging is exothermic reaction. Therefore, equilibrium must be maintained between incoming and outgoing of heat in the package 1 so that the temperature of module battery 4 which rises at discharging can lower in charging to the temperature at the starting of discharging.

For the above reasons, in the sodium-sulfur battery system shown in FIG. 8 to FIG. 13, it is important how to suitably control the temperature in the package 1. Hitherto, discharging of heat generated from module battery 4 out of the package 1 has been carried out by natural ventilation which comprises introducing air from a plurality of air inlet louvers 2 provided at one door 5 at one face (front face) of the package 1 corresponding to the position of the module battery 4 as shown in FIG. 12 and discharging the air from air outlet 3 provided at the ceiling of package 1. The size of air inlet louver 2 and air outlet 3 of package 1 and quantity of exhaustion air have been determined after conducting designing of heat ventilation for heat dissipation from module battery 4.

As a prior document relating to package for sodium-sulfur battery, mention may be made of, for example, Patent Document 1.

Patent Document 1: Japanese Patent No. 3474821

DISCLOSURE OF INVENTION

[Problem to be Solved by the Invention]

So far as the sodium-sulfur batteries are utilized as main constitutive devices of electric power storage and compensation apparatus for load leveling (demand for electric power), no particular problems have occurred in conventional package 1 shown in FIG. 8-FIG. 13 where natural ventilation is effected. However, in the case of the sodium-sulfur batteries being utilized in the electric power storage and compensation apparatus constructed in combination with a natural energy electricity generator, there are problems that heat ventilation cannot be sufficiently performed in package 1, and temperature in package 1 rises or lowers too much, resulting in inefficient operation of sodium-sulfur batteries. It has been considered that this is because when the electric power storage and compensation apparatus is combined with a natural energy electricity generator, in many cases, it is installed in an environment where temperature or direction of wind changes greatly.

A natural energy electricity generator which generates electric power by wind force, sunlight, terrestrial heat, etc. is a clean electric generator which does not use the restricted resources such as petroleum, and which uses energy sources which are inexhaustibly present in nature, and which can be inhibited from discharging of carbon dioxide. Thus, from the point of inhibition of increase in temperature of the earth, enterprises and self-governing bodies will increasingly introduce the natural energy electricity generators. Therefore, for efficient operation of sodium-sulfur batteries combined with the natural energy electricity generators, it is desired to realize a means by which the temperature in the package can be properly controlled even when sodium-sulfur batteries are installed in outdoor environment where temperature or direction of wind changes greatly.

Under the circumstances, the object of the present invention is to provide a package for sodium-sulfur batteries in which the temperature can be properly controlled even when it is installed in an environment where temperature or direction of wind greatly changes. As a result of an intensive research, it has been found that the object can be attained by a package for sodium-sulfur batteries as shown below.

[Means for Solving the Problem]

That is, according to the present invention, there is provided a package for sodium-sulfur batteries containing a frame in which a plurality of module batteries stacked with providing a space a between upper surface of one module battery and bottom surface of another module battery are disposed in two rows with providing a space b between one row and another row, where air inlets are provided at the positions of a wall face on the side of the one row and a wall face on the side of the another row which correspond to the positions of the lowermost module batteries, air inlet louvers are provided at the respective air inlets, an air outlet is provided at ceiling part between the one row and the another row, an air guiding plate A is provided being inclined obliquely and downwardly toward wall face on the side of the one row between the bottom surface of module battery constituting the one row and the wall face on the side of the one row for every module battery, except for at least the lowermost module battery, with providing a given interval between the upper edge portion of the air guiding plate A and the wall face on the side of the one row and additionally an air guiding plate B is provided being inclined obliquely and downwardly toward wall face on the side of the another row between the bottom surface of module battery constituting the another row and the wall face on the side of the another row for every module battery, except for at least the lowermost module battery, with providing a given interval between the upper edge portion of the air guiding plate B and the wall face on the side of the another row, and furthermore, a flow rectifying plate A is provided being inclined obliquely and upwardly toward space b between the one row and the another row from the upper surface of module battery constituting the one row of the module batteries, and a flow rectifying plate B is provided being inclined obliquely and upwardly toward space b between the one row and the another row from the upper surface of the module battery constituting the another row, with providing a given interval between the flow rectifying plate A and the flow rectifying plate B.

It is preferred that in the package for sodium-sulfur batteries of the present invention, the air outlet is formed to face sideward on the side of the one row of the module batteries and the side of the another row of the module batteries and comprises a tubular portion which opens upwardly and a top cover portion which covers the tubular portion with a space c between the tubular portion and the top cover, and a horizontal baffle plate is provided at a peak of the tubular portion.

It is preferred that the package for sodium-sulfur batteries of the present invention has a fan which forcedly introduces air into the package through an air inlet louver.

It is preferred that the package for sodium-sulfur batteries of the present invention has a temperature measuring means which measures the temperature in the package and a fan controlling means which performs on-off control of the fan or controls the rotation speed.

As the temperature measuring means (temperature sensor), there may be used a thermocouple or a temperature measuring resistor. As for the fitting position and the number of the temperature measuring means (temperature sensor), a necessary number of the temperature measuring means are disposed at the position at which members such as cable are disposed and the temperature becomes highest.

The package for sodium-sulfur batteries of the present invention is preferably provided with a dust filter and a salt resistant filter at the air inlet louver.

It is preferred that the package for sodium-sulfur batteries of the present invention has one door and another door relatively smaller than the said door at the wall face on the side of the one row and the wall face on the side of the another row, and air inlet louver at the another door.

The package for sodium-sulfur batteries of the present invention can be suitably used when the sodium-sulfur batteries are those which constitute electric power storage and compensation apparatus and compensate change in output of electricity generator in linking system supplying electric power to electric power system by combining the electricity generator in which output fluctuates with the electric power storage and compensation apparatus. The electricity generator is a natural energy electricity generator using natural energies, for example, wind, sunlight, and the heat of the earth.

[Advantages of the Invention]

The package for sodium-sulfur batteries according to the present invention contains a frame in which a plurality of module batteries stacked with providing a space a between upper surface of one module battery and bottom surface of another module battery are disposed in two rows with providing a space b between one row and another row, where air inlets are provided at the positions of a wall face on the side of the one row and a wall face on the side of the another row which correspond to the lowermost module batteries, air inlet louvers are provided at the respective air inlets, and an air outlet is provided at ceiling part between the one row and the another row. That is, the package for sodium-sulfur batteries according to the present invention has such a structure that two conventional packages in which the stacked module batteries are contained in one row are arranged back to back with providing a space b at the portion of the packages contacting back to back (the central portion of the total packages), and an air outlet is provided at ceiling part above the space b. In such an embodiment, air enters into the package from air inlet louver provided at both of wall face on the side of the one row (for example, front side) and wall face on the side of the another row (for example, back side), passes to the space b through the space a between the module batteries, and is discharged from the air outlet at the central ceiling part (through space c referred to hereinafter). Since air can be taken in from both air inlet louvers on front side and back side, air can easily enter even when the direction of air changes, and thus even if the package is installed in an environment where direction of wind is apt to change, there is substantially no such problem that the flow of air is stopped and heat ventilation cannot be sufficiently performed, and the temperature in the package rises too much, resulting in inefficient operation of the sodium-sulfur battery system.

In the package for sodium-sulfur batteries according to the present invention, an air guiding plate A inclined obliquely and downwardly toward wall face on the side of the one row is provided between bottom surface of module battery constituting the one row and wall face on the side of the one row and provided at every module battery, except for at least the lowermost module battery, with providing a given interval between upper edge portion of the air guiding plate A and wall face on the side of the one row, and besides an air guiding plate B inclined obliquely and downwardly toward wall face on the side of the another row is provided between bottom surface of module battery constituting the another row and wall face on the side of the another row and provided at every module battery, except for at least the lowermost module battery, with providing a given interval between upper edge portion of the air guiding plate B and wall face on the side of the another row, and furthermore, a flow rectifying plate A is provided being inclined obliquely and upwardly toward space b between the one row and the another row from the upper surface of module battery constituting the one row, and a flow rectifying plate B is provided being inclined obliquely and upwardly toward space b between the one row and the another row from the upper surface of module battery constituting the another row, with providing a given interval between the flow rectifying plate A and the flow rectifying plate B. According to such embodiments, air is introduced into space a between the module batteries constituting the one row and the another row by the air guiding plates A, B inclined obliquely and downwardly toward wall face on the side of the one row or on the side of the another row, and furthermore, the air is smoothly introduced (discharged) into space b from space a by the air rectifying plates A, B. Even when a rising current of air (flow of rising air) occurs due to the heat generated from module batteries, the air smoothly enters into the space a between the respective module batteries without staying. Since there is a given interval between the upper edge portion of air guiding plates A, B and wall face on the side of the one row or the another row, and pressure loss can be caused in the space a, air smoothly and nearly uniformly enters into the space a between a plurality of the stacked module batteries. Further, since there is a given interval between the flow rectifying plate A and the flow rectifying plate B inclined obliquely and upwardly toward the space b, air is smoothly and nearly uniformly discharged into space b from space a between a plurality of the stacked module batteries. Therefore, in the package for sodium-sulfur batteries according to the present invention, stay of flow of air hardly occurs, air smoothly flows, and discharge of heat out of the package can be effectively performed. Particularly, there hardly occur the problems that heat is retained in the space a between modules to cause occurrence of partial high temperature or partial low temperature. Thus, the problem that the temperature in the package rises or lowers too much, and operation of the sodium-sulfur battery system becomes inefficient can be avoided.

Since the flow of air in the package for sodium-sulfur batteries according to the present invention is smooth, retention of heat hardly occurs even if the space a between the module batteries is made smaller than in conventional package. Therefore, the package can be made smaller.

In the preferred embodiment of the package for sodium-sulfur batteries according to the present invention, the air outlet is formed to face sideward on the side of the one row and the side of the another row and comprises a tubular portion which opens upwardly and a top cover portion which covers the tubular portion with providing a space c between the tubular portion and the top cover, and hence the rain hardly enters into the package and the package hardly suffers from the effect of change in direction of air. Further, a horizontal baffle plate is provided at a peak of the tubular portion, and hence occurrence of back-flow of air due to strong wind can be reduced or prevented. Therefore, in this embodiment, also the flow of air passing through the package becomes smooth and hardly stays, and thus the problem that operation of sodium-sulfur battery system becomes inefficient owing to too much rising or lowering of temperature can be avoided.

The package for sodium-sulfur batteries according to the present invention has a fan which forcedly introduces air into the package through the air inlet louver, namely, forced ventilation can be performed, and hence air can be securely taken in the package and passed therethrough. The sodium-sulfur batteries combined with natural energy electricity generators are sometimes installed in the place where they may be injured by sea-water. In such place, the dust filter is apt to be clogged, and in the case of natural ventilation, air can hardly enter into the package. As a result, operation of the sodium-sulfur battery system becomes inefficient. In the preferred embodiment of the package for sodium-sulfur batteries according to the present invention, forced ventilation is possible and hence the above problem can be avoided.

In the case of the preferred embodiment where a fan is provided, since the package for sodium-sulfur batteries according to the present invention has a temperature measuring means and a fan controlling means, ventilation suitable for the temperature in the package can be carried out. Specifically, when the atmospheric temperature is low, it is possible to conduct control not so as to lower the temperature in the package too much by weakening the ventilation (reducing the amount of air passed (discharged)), and effectively utilizing heat generation of the module batteries. On the other hand, when the atmospheric temperature is high, the temperature in the package can be lowered to a proper temperature by strengthening the ventilation (increasing the amount of air passed (discharged)). Therefore, according to this embodiment, the sodium-sulfur battery system can be efficiently operated.

In the preferred embodiment of the package for sodium-sulfur batteries of the present invention, the air inlet louver is provided with a salt resistant filter in addition to the dust filter, and hence even when it is installed in the place where injury from salt is significant, the salt (sea-water salt particles) can be securely filtered. Thus, there hardly occur the problems that the module batteries, controllers, etc. are corroded with salt to cause troubles in electric system or the like.

Since the package for sodium-sulfur batteries of the present invention has one door and another door relatively smaller than the said door at the wall face on the side of the one row and the wall face on the side of the another row, the door which is to be opened under strong wind can be limited to the smaller door, and hence maintenance can be easily done. Particularly, when the package for sodium-sulfur batteries is installed in the place which is severely injured from salt, maintenance is done mainly for air inlet louver and filter, but since the air inlet louver is provided at the smaller door, maintenance of the air inlet louver and filter can be easily done with opening only the smaller door when the module batteries and controllers have no problems.

BEST MODE FOR CARRYING OUT THE INVENTION

Embodiments of the present invention will be explained below referring to the drawings, which should not be construed as limiting the invention. It will be understood that various changes, amendments, improvements and substitution may be made by those skilled in the art within the principle and scope of the invention. For example, the drawings express the suitable embodiments of the present invention, and the present invention is not restricted by the embodiments expressed in the drawings and the information shown in the drawings. For working and verifying the invention, means same as or equivalent to those described in this specification can be applied, and suitable means are as mentioned below.

FIG. 1, FIG. 2 and FIG. 3 show outer shape of a sodium-sulfur battery system using the package for sodium-sulfur batteries according to the present invention. FIG. 4, FIG. 5, FIG. 6 and FIG. 7 show inner structure of a sodium-sulfur battery system using the package for sodium-sulfur batteries according to the present invention. FIG. 7 is an enlargement of FIG. 5, and the arrow in FIG. 5 and FIG. 7 shows the flow of air (wind). FIG. 5 and FIG. 7 are illustrated omitting a part of the system.

The sodium-sulfur battery system 110 shown in FIG. 1-FIG. 7 is a sodium-sulfur battery system which constitutes electric power storage and compensation apparatus and compensates change in output of a wind electricity generator in linking system supplying electric power to electric power system by combining (for example) a wind electricity generator with an electric power storage and compensation apparatus, in which module batteries 4a and 4b each comprises a given number of connected cells, a plurality of the module batteries 4a and 4b are further connected and disposed in frame 6 together with controllers, and the frame 6 is stored in the package 101.

In the sodium-sulfur battery system 110, a plurality of module batteries 4a and 4b are stacked in multi-layer with providing a space 7 (corresponding to space a) between upper surface of one module battery and bottom surface of another module battery. The module batteries 4a are stacked on the side of one row (lower side in FIG. 6 and left side in FIG. 5 and FIG. 7) and module batteries 4b are stacked on the side of another row (upper side in FIG. 6 and right side in FIG. 5 and FIG. 7), and these batteries 4a and 4b form two rows with providing a space 8 (corresponding to space b) between one row and another row.

The package 101 stores the frame 6 in which the module batteries are disposed in two rows, and as understandable by comparing FIG. 6 and FIG. 13, the package 101 has such a structure that two conventional packages 1 (FIG. 13) in which the stacked module batteries are in one row are arranged back to back. The space 8 is provided at the portion of the packages facing back to back, namely, the central portion of the total packages.

The package 101 has an air inlet louver 102 at the positions corresponding to the lowermost module batteries 4a, 4b at the wall face 109a on the side of one row and at the wall face 109b on the side of another row, and has an air outlet 103 at the ceiling part above the space 8 between one row and another row. In FIG. 7, it appears that the air inlet louver 102 is provided above the positions corresponding to the lowermost module batteries 4a, 4b, and this is because fan 112 is provided and air is finally introduced into the package 101 through the fan 112 as mentioned hereinafter, and it means that final air inlet (intake) is provided at the positions corresponding to the lowermost module batteries 4a, 4b. When the fan 112 is not provided, the air inlet louver 102 per se is provided at the positions corresponding to the lowermost module batteries 4a, 4b.

In the package 101, there are provided air guiding plates 106a (corresponding to air guiding plate A) between the bottom surface of module battery 4a and the wall face 109a on the side of the one row. The air guiding plates 106a are provided in such a manner that they are inclined downwardly toward the wall face 109a to provide a given interval between upper edge part of the air guiding plate 106a and the wall face 109a (see FIG. 7). Similarly, on the side of the another row, there are provided air guiding plates 106b (corresponding to air guiding plate B) between the bottom surface of module battery 4b and the wall face 109b, and the air guiding plates 106b are inclined downwardly toward the wall face 109b to provide a given interval between upper edge part of the air guiding plates 106b and the wall face 109b (see FIG. 7). The air guiding plates 106a and 106b are provided inclining downwardly in order to effectively introduce air into the space 7 between the module batteries 4a and between the module batteries 4b even when a rising current of air occurs in the space between the module batteries 4a, 4b and the wall faces 109a, 109b. By providing the air guiding plates 106a and 106b, the air current (flow of air) flowing toward the space 7 between the module batteries 4a, 4b from the air inlet louver 102 becomes smooth, and thus it becomes possible to inhibit retention of heat in the space 7. The inclining angle of air guiding plates 106a and 106b inclining downwardly toward the wall faces 109a and 109b from the bottom face of module batteries 4a, 4b is preferably 30-150° to horizontal plane for reducing the difference in amount of air flowing over the respective stacked module batteries 4a, 4b.

The package 101 further has flow rectifying plates 107a, 107b at the outlet of the space 7 (the central side) The flow rectifying plate 107a (corresponding to flow rectifying plate A) is inclined upwardly toward space 8 from upper surface of module battery 4a, and the flow rectifying plate 107b (corresponding to flow rectifying plate B) is inclined upwardly toward space 8 from upper surface of module battery 4b. There is provided a given interval between the flow rectification plate 107a and the flow rectification plate 107b, and space 8 is secured as a space which does not hinder the flow of air (air stream) (see FIG. 7). The flow rectifying plates 107a and 107b are provided inclining upwardly in order to inhibit the flow of air from the upper surface of module batteries 4a, 4b into the space 8 from being hindered by a rising current flowing from the lower part of the space 8 and to smoothly and upwardly release the rising current flowing from the lower part of space 8. The inclining angle of flow rectifying plates 107a, 107b inclining obliquely and upwardly toward the space 8 from the upper face of module batteries 4a, 4b is preferably 30-60° to horizontal plane.

The air outlet 103 provided at the ceiling part of package 101 is formed of a tubular portion 113 which opens upwardly at the ceiling part of package 101 and a top cover portion 123 which covers the tubular portion 113. The air outlet 103 is preferably provided with a dust filter 143. A space 9 (corresponding to space c) is provided between the tubular portion 113 and the top cover portion 123 to secure flow path of the air discharged out of the package 101. The flow path of air is formed in such a manner that viewing from inside of package 101, it once rises at the tubular portion 113, then lowers downward by the top cover portion 123, and finally goes in horizontal direction since the air outlet 103 faces sideward on the side of the one row and the side of the another row, and hence the rain hardly enters into the package 101 from outside and back-flow of air hardly occurs. Furthermore, since a horizontal baffle plate 133 is provided at the peak of the tubular portion 113, back-flow of air further hardly occurs.

Package 101 has a large door 105b and a door 105a relatively smaller than the door 105b at the wall face 109a and wall face 109b. The smaller door 105a has air inlet louver 102 and additionally a fan 112 which forcedly introduces air into package 101 through the air inlet louver 102. As shown by arrows in FIG. 7, firstly air is taken into package 101 through the air inlet louver 102 provided at door 105a from both sides of the one row and the another row by rotation of fan 112. The air enters into space 7 between module batteries 4a and between module batteries 4b through the space between module batteries 4a, 4b and wall face 109a, 109b, then enters into space 8, and furthermore is discharged out of package 101 from space 9 of the ceiling part through air outlet 103. With such a flow of air (air stream including intake air and discharged air), heat generated from module batteries 4a, 4b is discharged out of package 101.

In package 101, shape and size of air inlet louver 102, size of air outlet 103 and ordinary (standard) amount of air to be discharged by fan 112 are determined upon conducting designing of heat ventilation on heat dissipation from module batteries 4a, 4b. If necessary, there is provided a roof beam masking plate 108 for controlling the heat dissipation from the uppermost module batteries 4a, 4b.

Furthermore, package 101 is provided with a temperature sensor 113 (temperature measuring means) which measures the temperature in the package 101 and furthermore a controller (not shown) (fan controlling means) which can carry out on-off control of fan 112 or control the rotation speed of fan 112. Therefore, depending on the temperature of environment in which the sodium-sulfur battery system 110 (package 101) is installed, the flow of air in package 101 can be controlled and the sodium-sulfur battery system 110 can be efficiently operated. As shown in FIG. 4 and FIG. 5, in package 101, temperature sensors 113 are provided at eight positions in front space (on the side of door 105b, see FIG. 1 and FIG. 2) of the fifth module batteries 4a, 4b of each row, but the number of the temperature sensor (the number of the points at which temperature is measured) can be reduced because the temperature of the respective rows is nearly equal.

Furthermore, in order that the sodium-sulfur battery system 110 can also be used in the area injured by sea-water, the air inlet louver 102 of package 101 is provided with salt resistant filter 132 in addition to the dust filter 122. Injury from salt can be inhibited by this salt resistant filter. In some areas injured by sea-water, the salt resistant filter 132 is apt to be clogged, but since this is fitted at air inlet louver 102 provided at smaller door 105a, changing, cleaning or repairing can be easily performed, and maintenance of salt resistant filter 132 and dust filter 122 is easy even under strong wind.

INDUSTRIAL APPLICABILITY

The package for sodium-sulfur batteries according to the present invention can be utilized as a package for sodium-sulfur batteries. Particularly, the package for sodium-sulfur batteries of the present invention can be suitably used as a package for storing a plurality of sodium-sulfur battery systems which constitute electric power storage and compensation apparatus in linking system supplying electric power to electric power system by combining electricity generator in which output fluctuates with electric power storage and compensation apparatus.

DESCRIPTION OF REFERENCE NUMERALS

Figure 1:
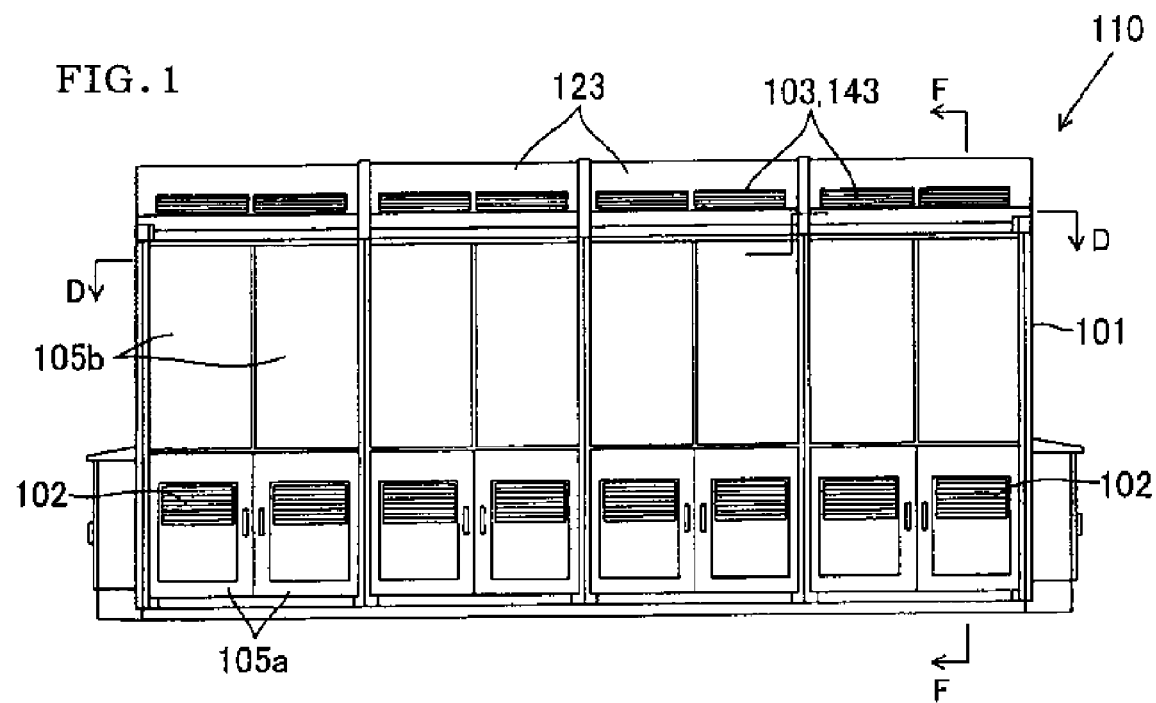
FIG. 1 shows one embodiment of the package for sodium-sulfur batteries according to the present invention and is a front view showing an outer shape of the sodium-sulfur battery system using the package for sodium-sulfur batteries according to the present invention.
Figure 2:
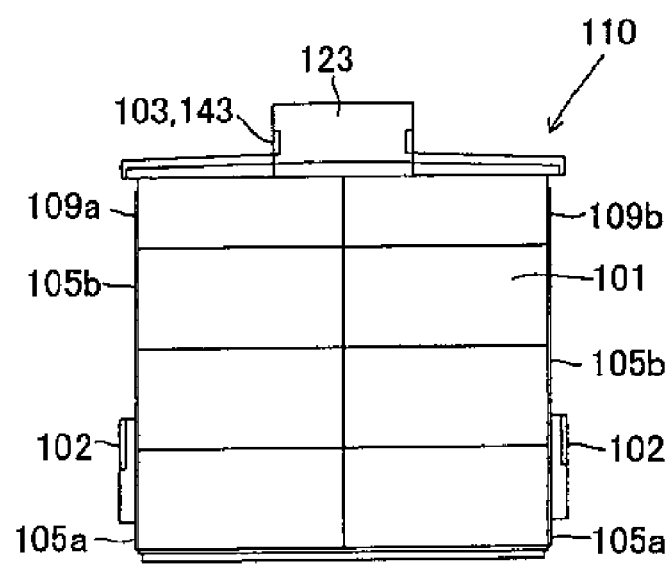
FIG. 2 is a left side view showing an outer shape of the sodium-sulfur battery system shown in FIG. 1.
Figure 3:
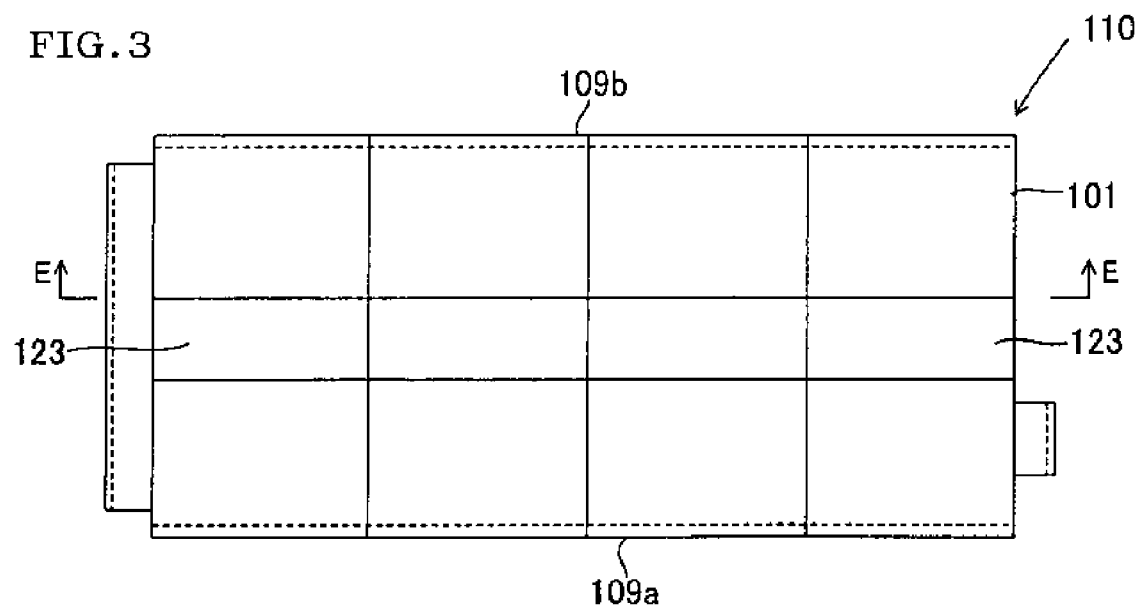
FIG. 3 is a plan view (top view) showing an outer shape of the sodium-sulfur battery system shown in FIG. 1.
Figure 4:
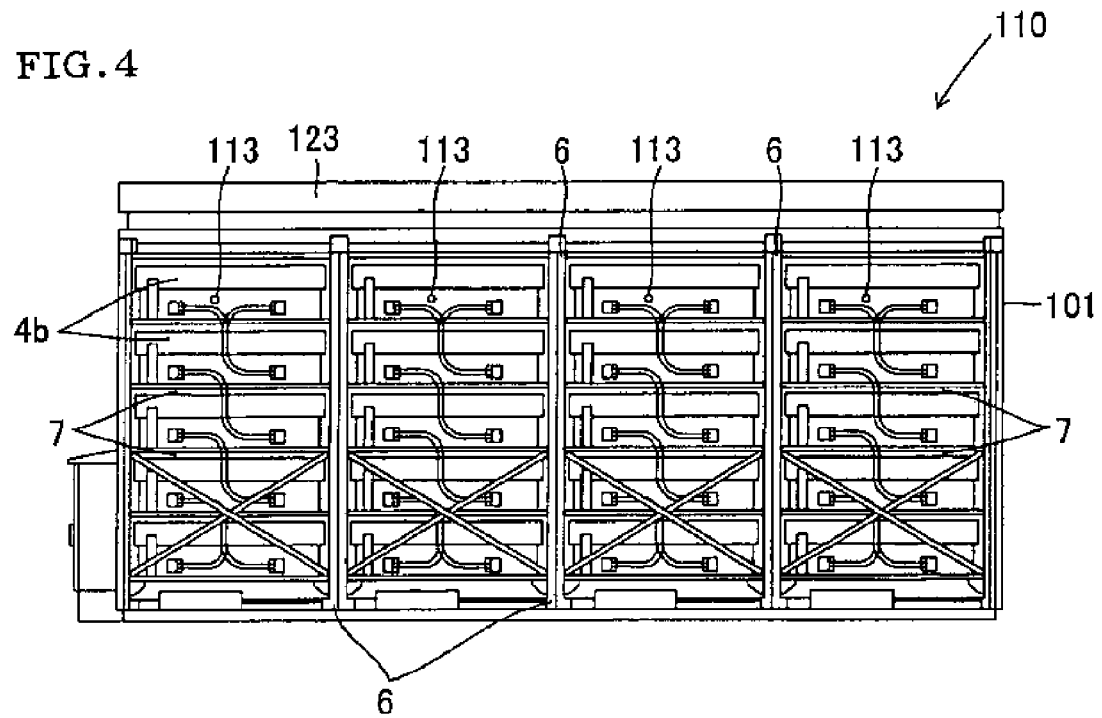
FIG. 4 shows inner structure of the sodium-sulfur battery system and is a sectional view taken on line E-E of FIG. 3.
Figure 5:
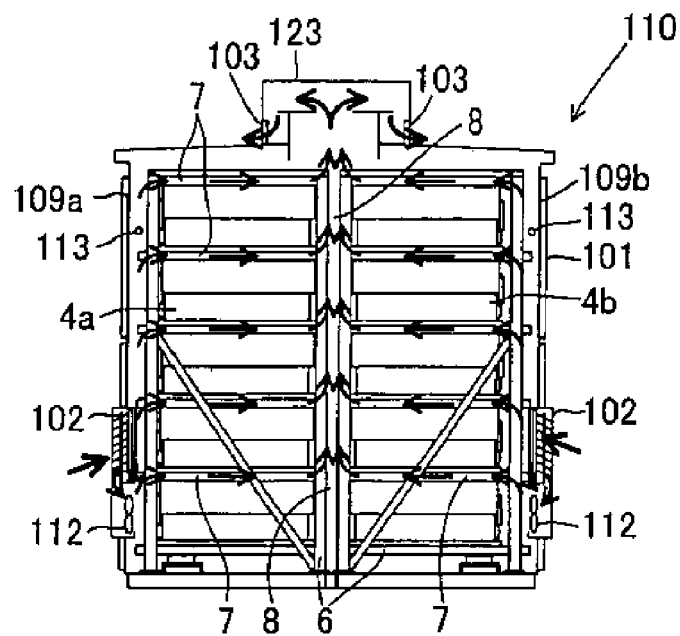
FIG. 5 shows inner structure of the sodium-sulfur battery system and is a sectional view taken on line F-F of FIG. 1.
Figure 6:
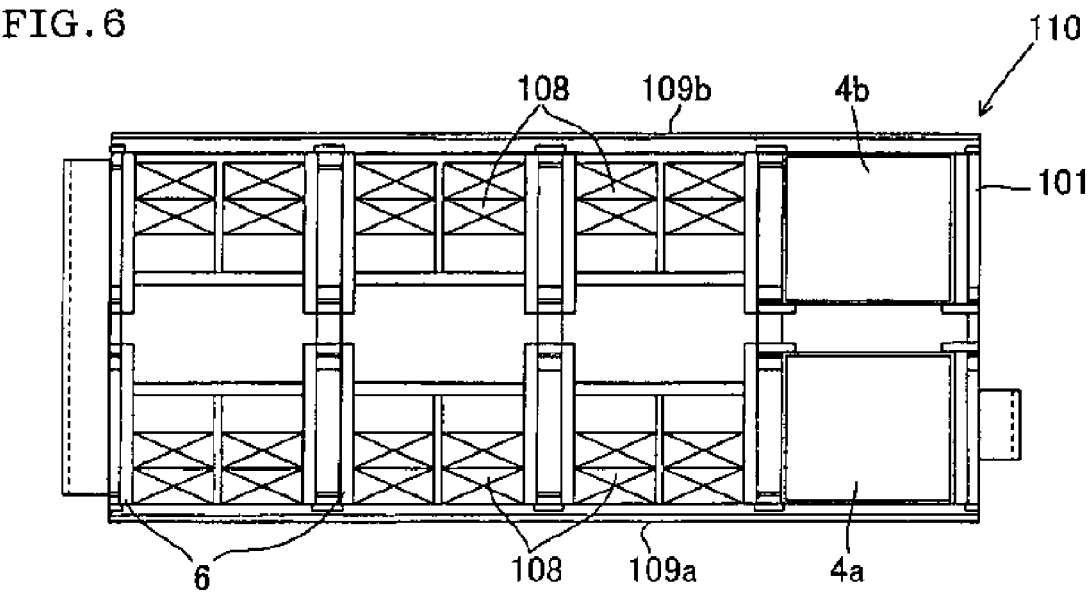
FIG. 6 shows inner structure of the sodium-sulfur battery system and is a sectional view taken on line D-D of FIG. 1.
Figure 7:
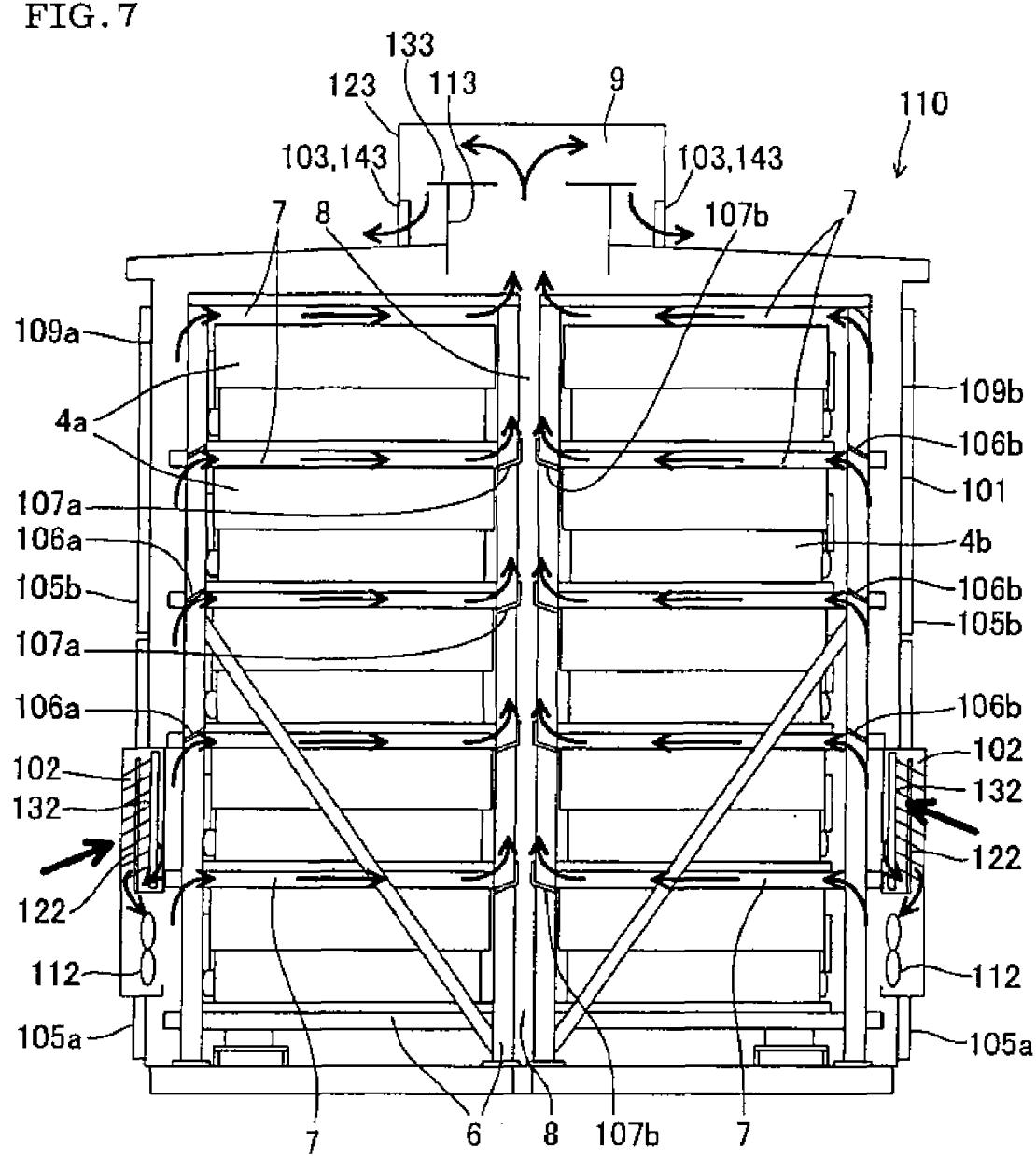
FIG. 7 is an enlarged view of FIG. 5, where flow of air (wind) is shown by arrows.
Figure 8:
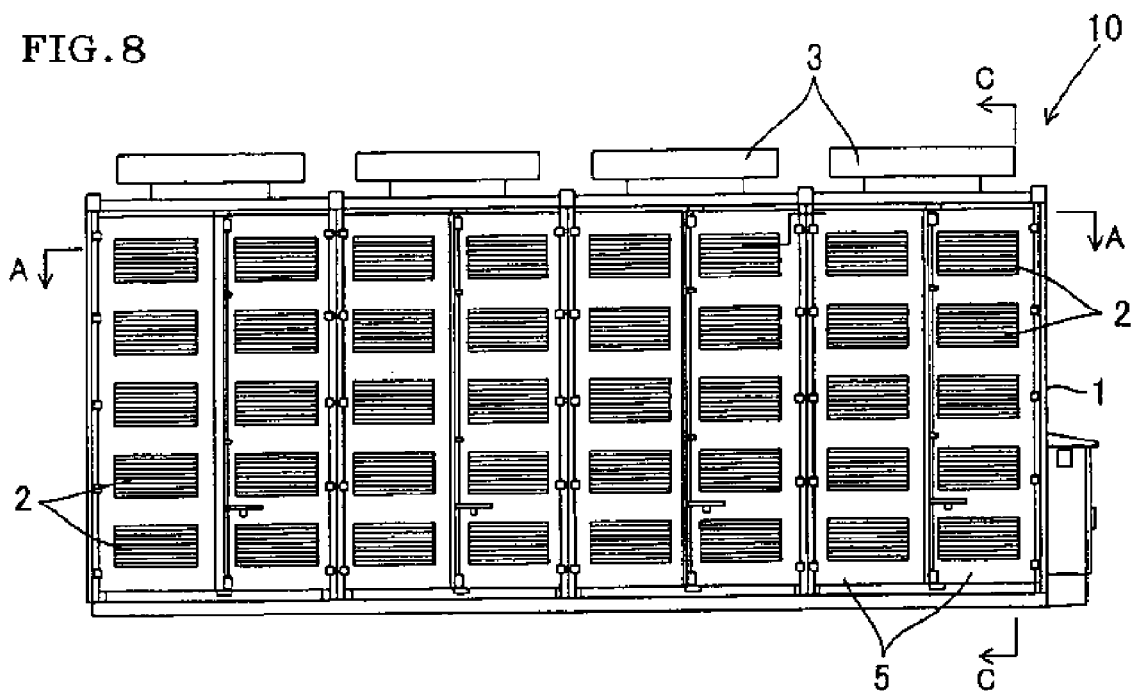
FIG. 8 shows one example of a conventional package for sodium-sulfur batteries and is a front view showing an outer shape of the sodium-sulfur battery system using the conventional package for sodium-sulfur batteries.
Figure 9:
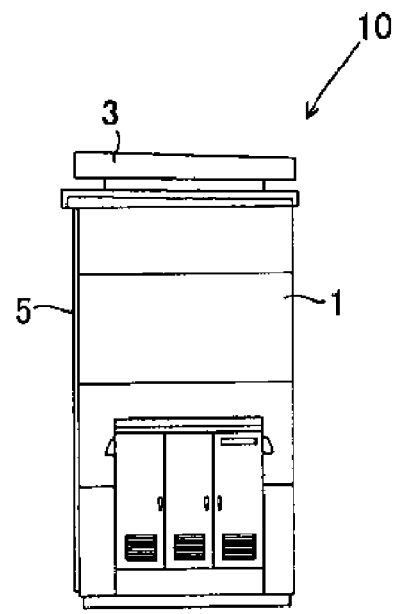
FIG. 9 is a left side view showing an outer shape of the sodium-sulfur battery system shown in FIG. 8.
Figure 10:
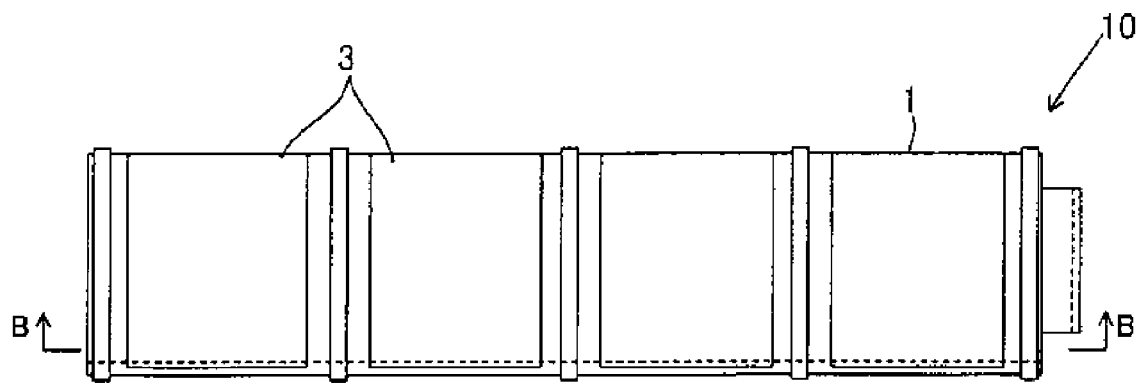
FIG. 10 is a plan view (top view) showing an outer shape of the sodium-sulfur battery system shown in FIG. 8.
Figure 11:
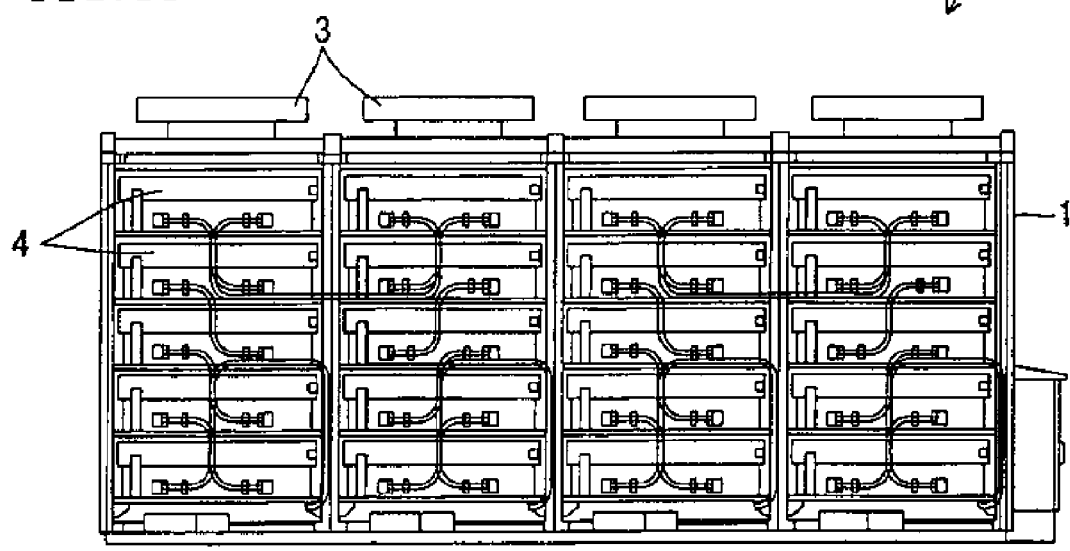
FIG. 11 shows inner structure of the sodium-sulfur battery system and is a sectional view taken on line B-B of FIG. 10.
Figure 12:
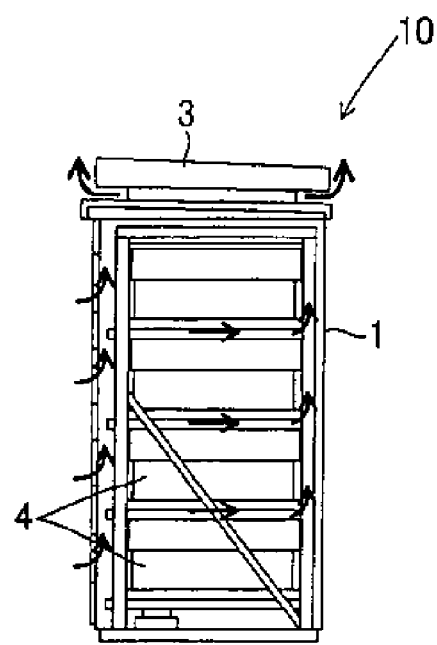
FIG. 12 shows inner structure of the sodium-sulfur battery system and is a sectional view taken on line C-C of FIG. 8.
Figure 13:
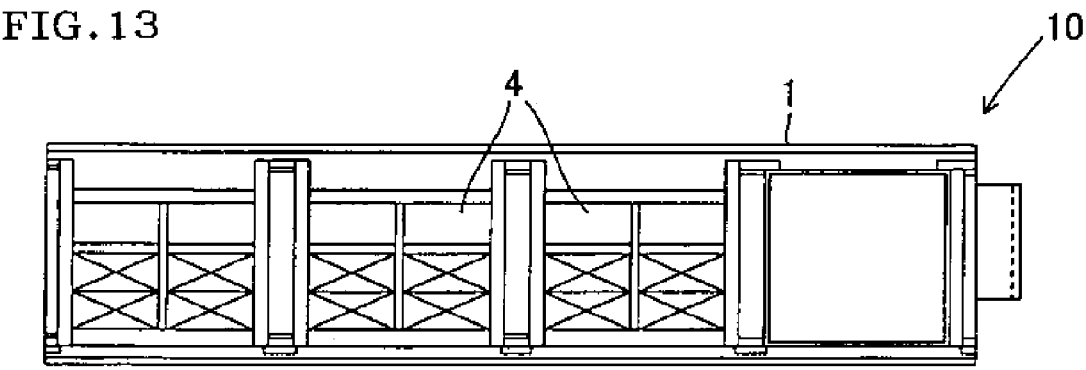
FIG. 13 shows inner structure of the sodium-sulfur battery system and is a sectional view taken on line A-A of FIG. 8.

1: package, 2: air inlet louver, 3: air outlet, 4: module battery, 4a, 4b: module battery, 5: door, 6: frame, 7: space, 8: space, 9: space, 10: sodium-sulfur battery system, 101: package, 102: air inlet louver, 103: air outlet, 105a, 105b: door, 106a, 106b: air guiding plate, 107a, 107b: flow rectifying plate: 108: roof beam masking plate, 109a, 109b: wall face, 110: sodium-sulfur battery system, 112: fan, 113: temperature sensor, 122: dust filter, 132: salt resistant filter

The invention claimed is:

1. A package for sodium-sulfur batteries containing a frame in which a plurality of module batteries stacked with providing a space a between upper surface of one module battery and bottom surface of another module battery are disposed in two rows with providing a space b between one row and another row, where air inlets are provided at the positions of a wall face on the side of the one row and a wall face on the side of the another row which correspond to the lowermost module batteries, air inlet louvers are provided at the respective air inlets, an air outlet is provided at ceiling part between the one row and the another row, an air guiding plate A is provided being inclined obliquely and downwardly toward wall face on the side of the one row between bottom surface of module battery constituting the one row and wall face on the side of the one row for every module battery, except for at least the lowermost module battery, with providing a given interval between upper edge portion of the air guiding plate A and wall face on the side of the one row, and besides an air guiding plate B is provided being inclined obliquely and downwardly toward wall face on the side of the another row between bottom surface of module battery constituting the another row and wall face on the side of the another row for every module battery, except for at least the lowermost module battery, with providing a given interval between upper edge portion of the air guiding plate B and wall face on the side of the another row, and a flow rectifying plate A is provided being inclined obliquely and upwardly toward space b between the one row and the another row from the upper surface of module battery constituting the one row, and a flow rectifying plate B is provided being inclined obliquely and upwardly toward space b between the one row and the another row from the upper surface of module battery constituting the another row, with providing a given interval between the flow rectifying plate A and the flow rectifying plate B.

2. A package for sodium-sulfur batteries according to claim 1, wherein the air outlet is formed to face sideward on the side of the one row and the side of the another row by a tubular portion which opens upwardly and a top cover portion which covers the tubular portion with providing a space c between the tubular portion and the top cover, and a horizontal baffle plate is provided at a peak of the tubular portion.

3. A package for sodium-sulfur batteries according to claim 1, wherein the package has a fan which forcedly introduces air into the package through the air inlet louver.

4. A package for sodium-sulfur batteries according to claim 3, wherein the package has a temperature measuring means which measures the temperature in the package and a fan controlling means which carries out on-off control of the fan or controls the rotation speed of the fan.

5. A package for sodium-sulfur batteries according to claim 3, wherein a dust filter and salt resistant filter are provided at the air inlet louver.

6. A package for sodium-sulfur batteries according to claim 3, wherein one door and another door relatively smaller than the said door are provided at the wall face on the side of the one row and the wall face on the side of the another row, and the air inlet louver is provided at other doors.

7. A linking system for supplying electric power to an electric power system which comprises an electric power storage and compensation apparatus having a series of sodium-sulfur batteries housed in a package for sodium-sulfur batteries according to claim 3 and an electricity generator in which output fluctuates.

8. A package for sodium-sulfur batteries according to claim 1, wherein a dust filter and salt resistant filter are provided at the air inlet louver.

9. A package for sodium-sulfur batteries according to claim 1, wherein one door and another door relatively smaller than the said door are provided at the wall face on the side of the one row and the wall face on the side of the another row, and the air inlet louver is provided at other doors.

10. A linking system for supplying electric power to an electric power system which comprises an electric power storage and compensation apparatus having a series of sodium-sulfur batteries housed in a package for sodium-sulfur batteries according to claim 1 and an electricity generator in which output fluctuates.

* * * * *